(12) United States Patent
Sartori et al.

(10) Patent No.: US 9,648,484 B2
(45) Date of Patent: May 9, 2017

(54) SYSTEM AND METHOD FOR RESOURCE ALLOCATION FOR OPEN DISCOVERY IN DEVICE-TO-DEVICE COMMUNICATIONS

(71) Applicant: Futurewei Technologies, Inc., Plano, TX (US)

(72) Inventors: Philippe Sartori, Plainfield, IL (US); Hossein Bagheri, Arlington Heights, IL (US); Anthony C. K. Soong, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 176 days.

(21) Appl. No.: 14/454,143

(22) Filed: Aug. 7, 2014

(65) Prior Publication Data

US 2015/0043483 A1 Feb. 12, 2015

Related U.S. Application Data

(60) Provisional application No. 61/864,469, filed on Aug. 9, 2013.

(51) Int. Cl.
*H04W 8/00* (2009.01)
*H04W 72/04* (2009.01)
(Continued)

(52) U.S. Cl.
CPC .......... *H04W 8/005* (2013.01); *H04W 72/02* (2013.01); *H04W 72/04* (2013.01);
(Continued)

(58) Field of Classification Search
CPC ... H04W 76/023; H04W 8/005; H04W 4/005; H04W 92/18; H04W 72/02; H04W 76/043
(Continued)

(56) References Cited

U.S. PATENT DOCUMENTS 8,121,097 B2 * 2/2012 Li .................. H04B 1/7143
370/337
2010/0110929 A1 5/2010 Li et al.
(Continued)

FOREIGN PATENT DOCUMENTS

CN 102857901 A 1/2013
CN 103179669 A 6/2013
(Continued)

OTHER PUBLICATIONS

International Search Report mailed Oct. 29, 2014 for Application No. PCT/CN2014/084070, 12 pages.
(Continued)

*Primary Examiner* — Charles C Jiang
*Assistant Examiner* — Will Lin
(74) *Attorney, Agent, or Firm* — Slater Matsil, LLP

(57) ABSTRACT

A method for performing open discovery in a communications system includes determining, by a device-to-device (D2D) device, resource allocation information for a discovery cycle including discovery resources allocated for transmission of discovery signals by D2D devices. The method also includes selecting, by the D2D device, a first discovery resource of the discovery cycle in accordance with the resource allocation information, and transmitting, by the D2D device, a discovery signal in the selected first discovery resource.

23 Claims, 6 Drawing Sheets

(51) Int. Cl.
*H04W 76/02* (2009.01)
*H04W 72/02* (2009.01)
*H04W 24/10* (2009.01)
*H04L 5/00* (2006.01)

(52) U.S. Cl.
CPC ......... *H04W 76/023* (2013.01); *H04L 5/0048* (2013.01); *H04W 72/0446* (2013.01)

(58) Field of Classification Search
USPC .................................................. 370/329, 330
See application file for complete search history.

(56) References Cited

U.S. PATENT DOCUMENTS

| | | | |
|---|---|---|---|
| 2011/0268101 A1* | 11/2011 | Wang | H04L 5/0053 370/344 |
| 2013/0109301 A1 | 5/2013 | Hakola et al. | |
| 2014/0003262 A1* | 1/2014 | He | H04W 28/08 370/252 |
| 2014/0286284 A1 | 9/2014 | Lim et al. | |
| 2015/0043448 A1* | 2/2015 | Chatterjee | H04W 8/005 370/329 |

FOREIGN PATENT DOCUMENTS

| | | |
|---|---|---|
| WO | 2013062310 A1 | 5/2013 |
| WO | 2013108219 A1 | 7/2013 |

OTHER PUBLICATIONS

"3rd Generation Partnership Project; Technical Specification Group Services and System Aspects; Feasiblilty study for Proximity Services (ProSe) (Release 12)," 3GPP TR 22.803 V12.0.0, Dec. 2012, 40 pages.

Huawei, "System-level simulation results for D2D discovery," 3GPP TSG RAN WGI Meeting #74, R1-132899, Barcelona, Spain, Aug. 19-23, 2013, 8 pages.

Huawei et al: "PHY Considerations for Discovery Signal Design," 3GPP TSG RAN WG1 Meeting #73, R1-132413, May 20-24, 2013, 6 pages, Fukuoka, Japan.

Qualcomm Incorporated: "Techniques for D2D Discovery," 3GPP TSG-RAN WG1 #73, R1-132503, May 20-24, 2013, 8 pages, Fukuoka, Japan.

\* cited by examiner

SYSTEM AND METHOD FOR RESOURCE ALLOCATION FOR OPEN DISCOVERY IN DEVICE-TO-DEVICE COMMUNICATIONS

This application claims the benefit of U.S. Provisional Application No. 61/864,469, filed on Aug. 9, 2013, entitled "Resource Allocation for Open Discovery in Device-to-Device (D2D) Communications," which application is hereby incorporated herein by reference.

TECHNICAL FIELD

The present disclosure relates generally to digital communications, and more particularly to a system and method for resource allocation for open discovery in device-to-device (D2D) communications.

BACKGROUND

Device-to-Device (D2D) technology is getting a lot of attraction because of the ability to offer new services, improve system throughput, and the like. Next generation wireless communication protocols are likely to implement D2D communication modes, where mobile stations communicate directly with one another rather than relaying wireless signals through an intermediate cellular infrastructure, e.g., cell towers, and the like. D2D communication may have a variety of practical advantageous, such as extending the coverage area of a cell or wireless local area network.

SUMMARY OF THE DISCLOSURE

Example embodiments of the present disclosure which provide a system and method for resource allocation for open discovery in device-to-device (D2D) communications.

In accordance with an example embodiment of the present disclosure, a method for performing device-to-device (D2D) discovery in a communications system is provided. The method includes determining, by a device-to-device (D2D) device, resource allocation information for a discovery cycle including discovery resources allocated for transmission of discovery signals by D2D devices, and selecting, by the D2D device, a first discovery resource of the discovery cycle in accordance with the resource allocation information. The method also includes transmitting, by the D2D device, a discovery signal in the selected first discovery resource.

In accordance with another example embodiment of the present disclosure, a method for operating an evolved NodeB (eNB) is provided. The method includes allocating, by the eNB, communications system resources for a discovery cycle, wherein the communications system resources are used in transmission of discovery signals by device-to-device (D2D) devices, and transmitting, by the eNB, information about the allocated communications system resources.

In accordance with another example embodiment of the present disclosure, a device-to-device (D2D) device is provided. The D2D device includes a processor, and a transmitter operatively coupled to the processor. The processor determines resource allocation information for a discovery cycle including discovery resources allocated for transmission of discovery signals by D2D devices, and selects a first discovery resource of the discovery cycle in accordance with the resource allocation information. The transmitter transmits a discovery signal in the selected first discovery resource.

One advantage of an embodiment is that resources allocated for open discovery provide D2D devices with known resources dedicated for discovery so that the discovery process does not interfere with other processes.

A further advantage of an embodiment is that techniques for avoiding discovery collisions are provided to help reduce collisions between discovery signals transmitted by D2D devices, which helps to improve overall discovery performance.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to resource allocation for open discovery in D2D Communications. For example, a D2D device determines resource allocation information for a discovery cycle including discovery resources allocated for transmission of discovery signals by D2D devices, and selects a first discovery resource of the discovery cycle in accordance with the resource allocation information. The D2D device also transmits a discovery signal in the selected first discovery resource.

The present disclosure will be described with respect to example embodiments in a specific context, namely communications systems that support open discovery in D2D communications. The disclosure may be applied to standards compliant communications systems, such as those that are compliant with Third Generation Partnership Project (3GPP), IEEE 802.11, and the like, technical standards, and non-standards compliant communications systems, that support open discovery in D2D communications.

Figure 1:
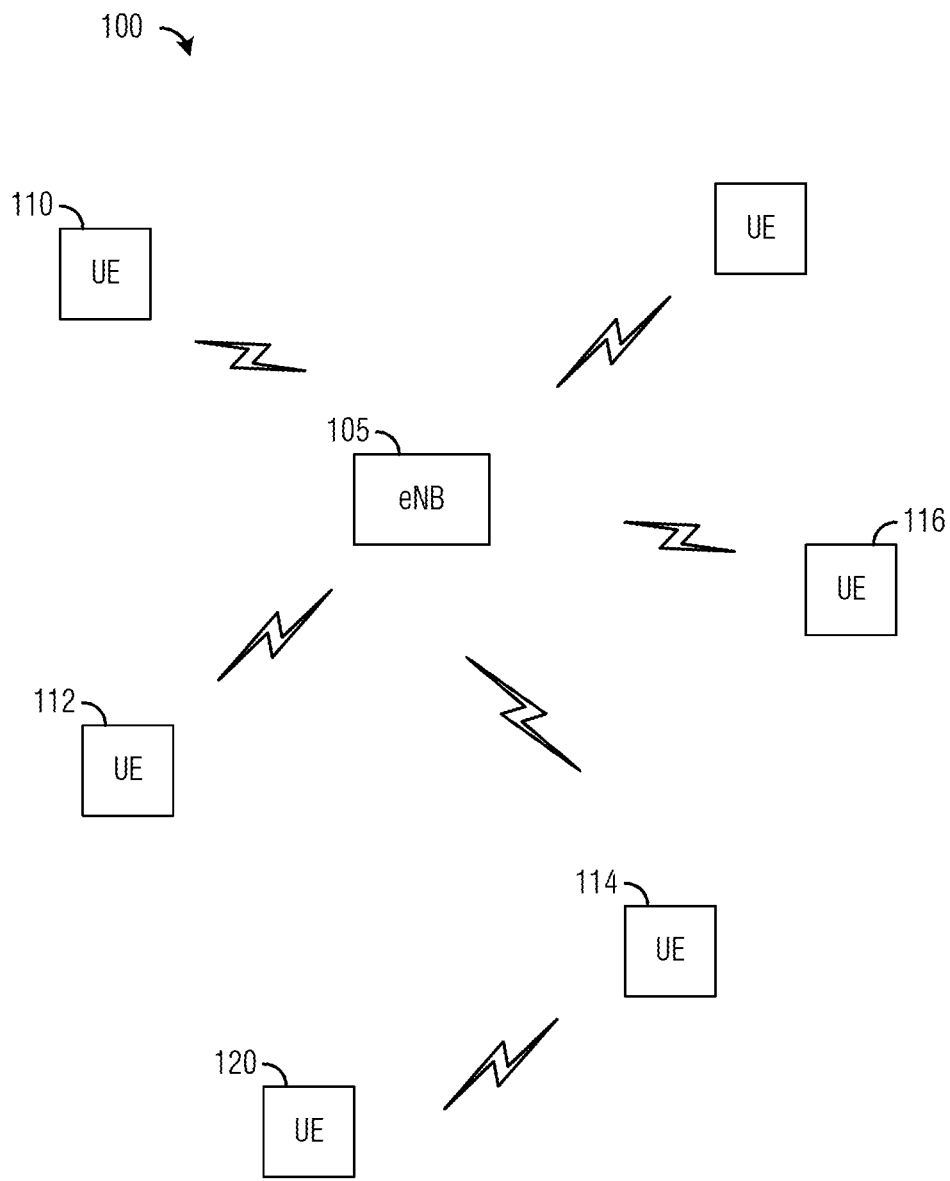
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UE 110, UE 112, UE 114, and UE 116. eNB 105 is serving the plurality of UEs by receiving transmission intended for a UE and then forwarding the transmitting to the UE or receiving a transmission from a UE and then forwarding the transmission to its intended destination. In such a communications mode, eNB 105 and the plurality of UEs are said to be operating in a cellular mode. eNBs may also be commonly referred to as NodeBs, access points, base stations, controllers, communications controllers, and the like, while UEs may also be commonly referred to as mobiles, mobile stations, terminals, users, subscribers, stations, and the like.

D2D communications is a different operating mode where UEs can directly transmit to one another without having their transmissions being relayed by an eNB. As shown in FIG. 1, UE 114 is communicating directly with UE 120. UE 114 may be capable of communicating in the cellular mode, as well as in the D2D mode. UE 120 is operating in a D2D mode, but it may also be possible that UE 120 is capable of operating in the cellular mode with eNB 105. However, such operation is not shown in FIG. 1.

While it is understood that communications systems may employ multiple eNBs capable of communicating with a number of UEs, only one eNB, and a number of UEs are illustrated for simplicity.

In general, discovery is a process wherein a device can find other devices or be found by other devices. Through the discovery process, the device can find other devices with which to communicate. eNB assisted discovery is one form of discovery. In eNB assisted discovery, a UE is directed to transmit a signal (e.g., a sounding reference signal (SRS) signal, a discovery-specific discovery signal, and the like) and another UE listens and reports the signal quality to the eNB. The eNB may, based on the signal quality report, determine if D2D communications (for example) can be enabled to the two UEs.

Open discovery is another form of discovery. In open discovery, UEs attempt to discover and be discovered by other UEs without being probed. Therefore, open discovery may be performed with limited facilitation by eNBs. According to an example embodiment, the eNB allocates communications system resources for the purpose of open discovery. The communications system resources allocated for open discovery may generally consist of uplink (UL) subframes, however, other communications system resources may be used. With open discovery, any UE can transmit a "beacon" signal, which may be referred to as a discovery signal, in one or more allocated communications system resources to advertise its presence to other UEs. In addition to transmitting discovery signals in communications system resources allocated for discovery, example embodiments disclose the use of discovery sequences that exploit time hopping to significantly improve the performance of discovery. Example embodiments also disclose systems and methods to determine communications system resources in which to transmit the discovery signals.

Generally, D2D communication may occur over any network bandwidth. In some example embodiments, D2D communication occurs on an UL portion of the network bandwidth in order to reduce the interference experienced by nearby UEs. More specifically, D2D transmissions on UL resources interfere with the eNB. As long as the D2D UE is a reasonable distance from the eNB, the interference created by the D2D UE has little impact on the eNB. Conversely, on DL portions of the network bandwidth, D2D transmissions affect neighboring UEs, and potentially, their ability to receive synchronization channels and physical downlink control channel (PDCCH) is affected, which may have a significantly higher negative impact than if the D2D UEs were transmitting on the UL.

Figure 2:
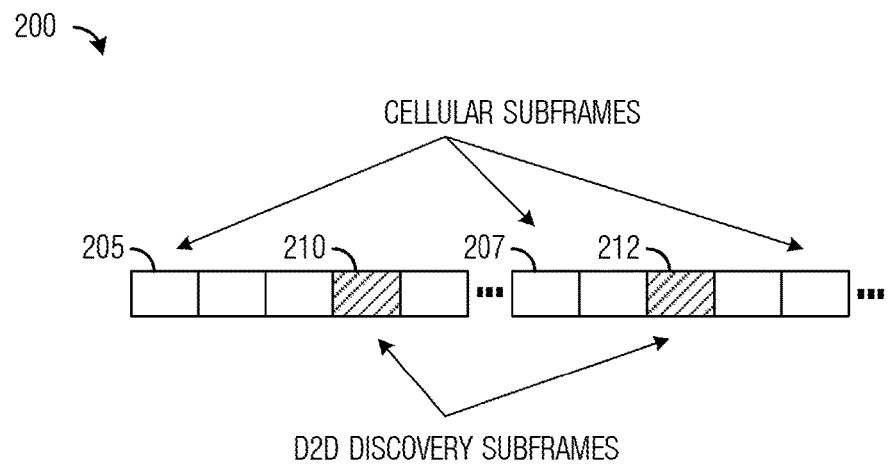
FIG. 2 illustrates example subframes supporting D2D open discovery according to example embodiments described herein.

FIG. 2 illustrates an example subframes 200 supporting D2D open discovery. Subframe 200 includes cellular subframes (such as subframes 205 and 207) and D2D discovery subframes (such as D2D discovery subframe 210 and 212). The D2D discovery subframes comprise a small percentage, such as 1%, of all subframes and are reserved for open discovery. During the D2D discovery subframes, only discovery signals are transmitted and there is usually no cellular communications.

Figure 3:
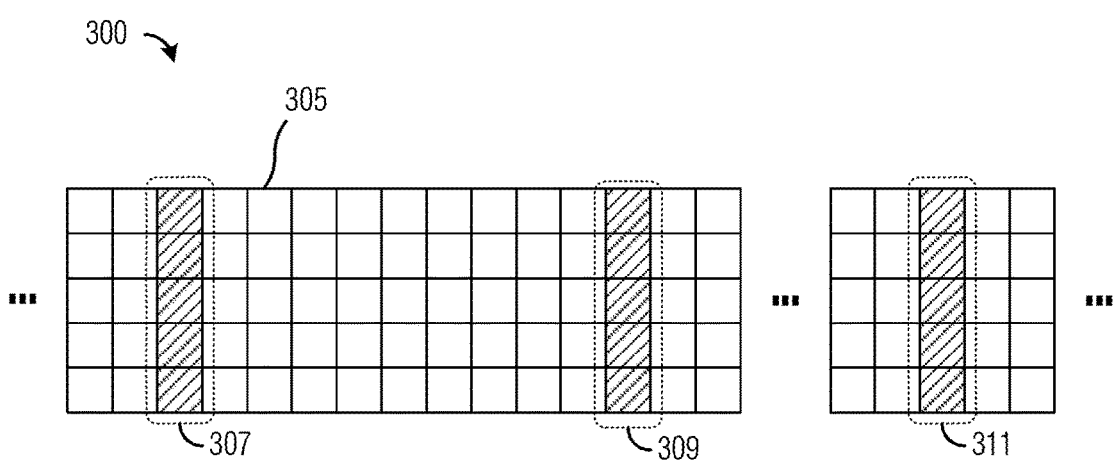
FIG. 3 illustrates an example plurality of subframes supporting D2D open discovery according to example embodiments described herein.

FIG. 3 illustrates an example plurality of subframes 300 supporting D2D open discovery. Each subframe of subframes 300, such as subframe 305, includes a plurality of communications system resources, such as resource elements (REs). The entirety of a subframe may be allocated for D2D open discovery, such as subframes 307, 309, and 311. Subframes allocated for D2D open discovery may be periodic in nature. As an illustrative example, every N-th subframe may be allocated for D2D open discovery, where N is an integer value, such as 1, 2, 3, 4, 5, 6, 7, 8, 9, and the like. It is noted that although the discussion focuses on the entirety of subframes being allocated for D2D open discovery, the example embodiments discussed herein are operable with portions of subframes being allocated for D2D open discovery. Additionally, the discussion mentions that that D2D open discovery subframes are periodic in nature. However, any subframe may be allocated for D2D open discovery as long as the UEs know the location of the subframe so that they can transmit discovery signals and listen for discovery signals of other UEs.

Figure 4:
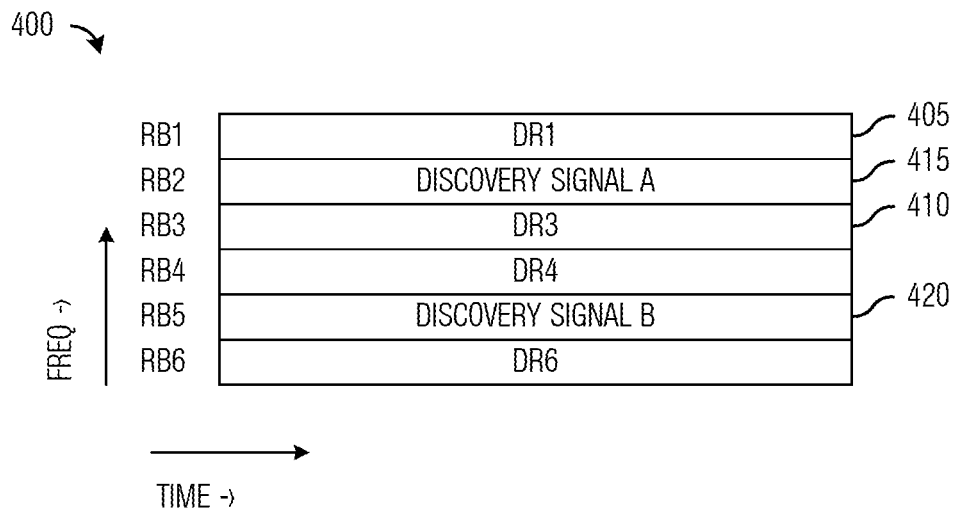
FIG. 4 illustrates an example subframe allocated for D2D open discovery according to example embodiments described herein.

FIG. 4 illustrates an example subframe 400 allocated for D2D open discovery. Subframe 400 includes a plurality of discovery resources (DR), such as DR1 405 and DR2 410. As shown in FIG. 4, subframe 400 includes 6 DRs, however, other subframe configurations may have different numbers of DRs. Each DR may comprise a set of REs within the subframe. As an example, a DR may be an entire physical resource block (PRB) pair. As shown in FIG. 4, 2 DRs of subframe 400 are occupied by discovery signals of UEs, with DR2 415 being occupied by discovery signal A and DR5 420 being occupied by discovery signal B.

On subframes allocated for D2D open discovery, UEs may need to determine whether to transmit a discovery signal, and if so, on which DR(s) to transmit the discovery signal. Example embodiments disclosed herein provide several techniques for making these determinations. Procedures for determining when and where to transmit discovery signals are provided herein. Furthermore, example techniques for developing, using, and/or obtaining time hopping sequences and secondary time hopping patterns aimed at reducing the number of collisions in discovery signal transmission (e.g., reducing discovery contention) are provided.

According to an example embodiment, an eNB allocates communications system resources for D2D open discovery and sends information about the allocated communications system resources to UEs.

Figure 5:
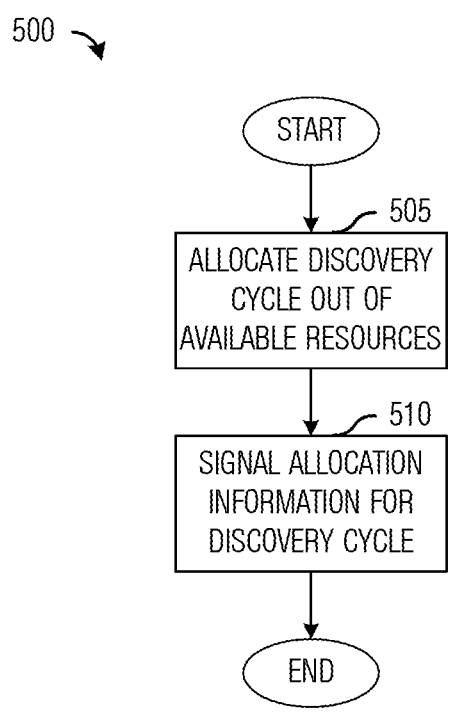
FIG. 5 illustrates a flow diagram of example operations occurring in an eNB as the eNB allocates a DC and signals information about the DC according to example embodiments described herein.

FIG. 5 illustrates a flow diagram of example operations 500 occurring in an eNB as the eNB allocates a discovery cycle (DC) and signals information about the DC. A DC may also be referred to as a discovery period. Operations 500 may be indicative of operations occurring in an eNB, such as eNB 105, as the eNB allocates a DC and signals information about the DC.

Operations 500 may begin with the eNB allocating communications system resources for D2D open discovery (block 505). The eNB may allocate N subframes for D2D open discovery, with N being an integer value. The N subframes form a discovery cycle (DC) wherein each UE participating in open discovery transmits once and only once per DC. The UE transmits a single discovery signal per DC, but is allowed to repeat the transmission within the DC. Each subframe comprises M DRs, where M is an integer value. Collectively, a DC comprises N×M DRs. The N subframes may be allocated out of the UL portion of the spectrum. The N subframes may be allocated out of the DL portion of the spectrum. The N subframes may be allocated out of both the UL portion and the DL portion of the spectrum.

The eNB may signal allocation information regarding the DC (block 510). As an illustrative example, the allocation information may include the N and M values associated with the DC. As another illustrative example, the allocation information may include information specifying the location of the DRs in the DC. The eNB may signal a value specifying the length of the DC. As an illustrative example, when a UE is in-network (i.e., the UE is attached to the communications system) the eNB may communicate the N and M values. The values may be signaled in a system information block (SIB) so that all in-network UEs can obtain the values. As an alternative illustrative example, the eNB may communicate the values using higher layer signaling, such as radio resource control (RRC) signaling.

In some situations, it may be unnecessary to send the M value. As an illustrative example, if a carrier bandwidth of the communications system consists of P PRB pairs, the UE may assume that M=P, where P is an integer value. As another illustrative example, the value of M may be set as the largest prime number smaller than P. As another illustrative example, the eNB may send the N×M value, especially in situations if the value of M does not need to be sent. The value of M may be indicated by the eNB in a number of ways. As an example, a number of discovery subframes, a number of subframes (regardless if they are reserved for open discovery or not), a time value, and the like.

The M and N values may be sent in a SIB that also includes additional information for D2D discovery, such as parameters indicating measurements the UE needs to perform, for example. Other possibilities may include M and/or N may be defined in an applicable technical standard (e.g., 3GPP LTE). Alternatively, the M and N values may be pre-configured in the UEs, the values may be independently computable (or a priori information of the UE) to allow UEs that are operating outside of the coverage area of the eNB to perform D2D open discovery.

According to an example embodiment, DCs are modified regularly instead of being statically defined. Modifying DCs on a regular basis, such as after completion of each DC, completion of a specified number of DCs, after a specified time duration, and the like, may help to reduce the number of discovery collisions and improve overall discovery performance.

According to an example embodiment, a UE determines information about allocated communications system resources for D2D open discovery, selects a communications system resource(s), and sends a discovery signal on the selected communications system resource(s).

Figure 6:
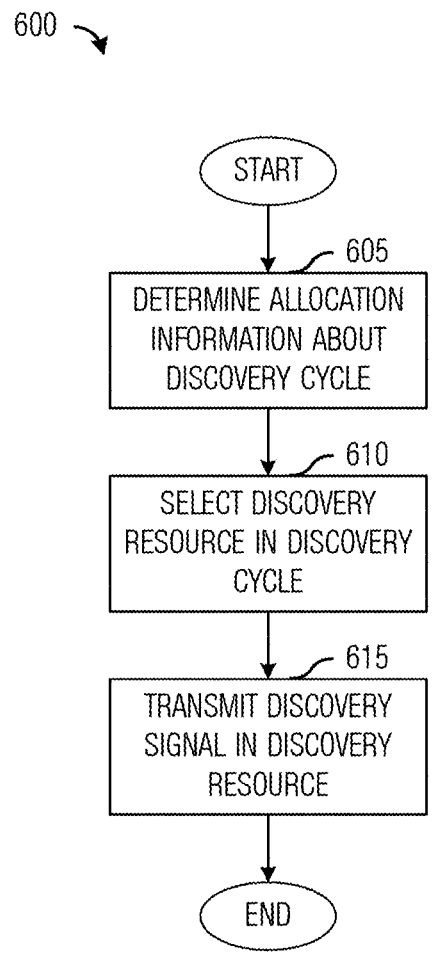
FIG. 6 illustrates a flow diagram of example operations occurring in a UE as the UE transmits a discovery signal in D2D open discovery according to example embodiments described herein.

FIG. 6 illustrates a flow diagram of example operations 600 occurring in a UE as the UE transmits a discovery signal in D2D open discovery. Operations 600 may be indicative of operations occurring in a UE, such as UE 114 and UE 120, as the UE transmits a discovery signal in D2D open discovery.

Operations 600 may begin with the UE determining allocation information about a DC (block 605). The allocation information may include the N and M values associated with the DC. Alternatively, the allocation information may include information specifying the location of the DRs in the DC. As an illustrative example, if the UE is operating within a coverage area of an eNB, the eNB may send the M and N values associated with the DC in a SIB, which may be decoded by the UE to obtain the M and N values. As an alternative illustrative example, the UE may receive the M and N values through higher layer messaging, such as RRC signaling, from the eNB. As another alternative illustrative example, it may be unnecessary for the eNB to send the M value, such as when M is equal a carrier bandwidth of the communications system (P), when M is set as the largest prime number smaller than P, when the eNB sends the value N×M, and the like.

As another illustrative example, if the UE is not in-network, the UE may not be able to receive and decode transmissions from the eNB. In such a situation, the UE may make use of pre-configured M and N values, independently computable M and N values (or a priori information), and the like.

The UE may select a DR(s) in the DC (block 610). In general, a DR in a DC that is made up of N subframes with M DRs per subframe may be indexed by two values i and j, where i is a subframe index and ranges from 1 to N, while j is a DR index within the i-th subframe and ranges from 1 to M. The UE may select the DR(s) by selecting i and j in a random manner, a pseudo-random manner, using a deterministic function, and the like. Details of different example embodiments for DR selection are presented below. Furthermore, the UE may re-select a DR(s) per DC to help reduce discovery collision. Alternatively, the UE may select the DR(s) by selecting an integer value k which ranges from 1 to N×M in a random manner, a pseudo-random manner, using a deterministic function, and the like, thereby simplifying the DR selection by having to only select a single value instead of two values.

The UE may transmit a discovery signal in the selected DR(s) (block 615). The UE may simply transmit the discovery signal in a DR indexed by values i and j (or k) as selected.

Figure 7A:
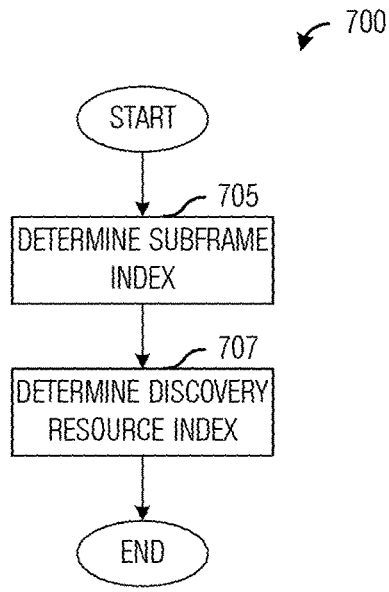
FIG. 7a illustrates a flow diagram of example operations occurring in a UE as the UE selects a DR(s) in a random or pseudo-random manner according to example embodiments described herein.

FIG. 7a illustrates a flow diagram of example operations 700 occurring in a UE as the UE selects a DR(s) in a random or pseudo-random manner. Operations 700 may be indicative of operations occurring in a UE, such as such as UE 114 and UE 120, as the UE selects a DR(s) in a random or pseudo-random manner.

Operations 700 may begin with the UE selecting a subframe index, i (block 705). As an illustrative example, the UE may utilize a random (or pseudo-random) function, e.g., random( ) to select the subframe index. As an alternative illustrative example, the UE may use a parameter, such as UE identifier (UE ID) or similar parameter, such as D2D identifier (D2D ID), a radio network temporary identifier (RNTI), and the like) as a seed for the random (or pseudo-random) function. As another alternative illustrative example, the UE may use an index of the DC as the seed for the random (or pseudo-random) function. The index for the DC may be the same for all UEs (e.g., determined on a radioframe and/or superframe index), or UE-specific (e.g., the number of DCs where the UE has already performed open discovery). The UE may select a DR index, j (block 707). The UE may use the same random (or pseudo-random) function and/or parameter to select the DR index as used to select the subframe index. Alternatively, the UE may use a different random (or pseudo-random) function and/or parameter to select the DR index.

Figure 7B:
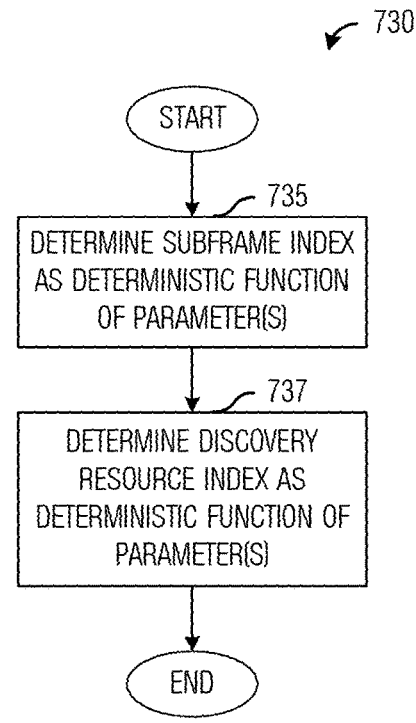
FIG. 7b illustrates a flow diagram of example operations occurring in a UE as the UE selects a DR(s) using a deterministic function according to example embodiments described herein.

FIG. 7b illustrates a flow diagram of example operations 730 occurring in a UE as the UE selects a DR(s) using a deterministic function. Operations 730 may be indicative of operations occurring in a UE, such as such as UE 114 and UE 120, as the UE selects a DR(s) using a deterministic function.

Operations 730 may begin with the UE selecting a subframe index i using a deterministic function (block 735). The deterministic function may also have a parameter that is associated with the UE, such as UE ID, D2D ID, RNTI, and the like. Many different deterministic functions may be used in the selection of the subframe index. In general, any function that selects a subframe index with relatively even distribution may be used. However, deterministic functions with skewed distributions may also be used. As an example, the UE may use i=(UE ID+T*a) mod(N) where a is a prime number larger than the largest possible UE ID and T is a number of DCs where the UE has already performed open discovery to select the subframe index. The UE may also select a DR index j using a deterministic function (block 737). The deterministic function may also have a parameter that is associated with the UE, such as UE ID, D2D ID, RNTI, and the like. Many different deterministic functions may be used in the selection of the DR index. The same deterministic function may be used to select the DR index or a different deterministic function may be used. As an example, the UE may use j=(UE ID+T*b) mod(M) where b is a prime number larger than the largest possible UE ID.

Figure 7C:
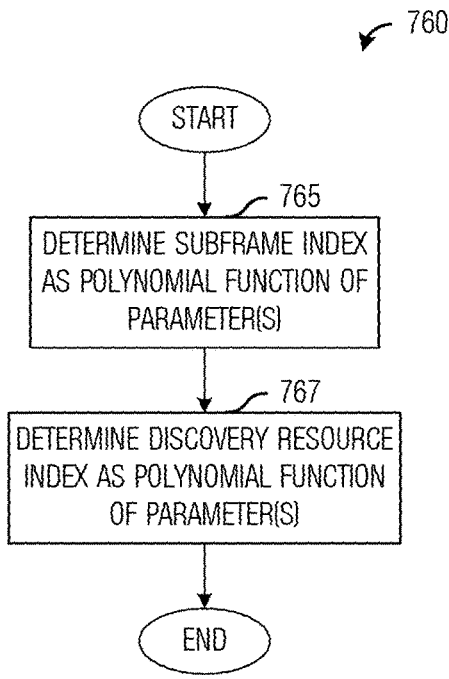
FIG. 7c illustrates a flow diagram of example operations occurring in a UE as the UE selects a DR(s) using a polynomial function according to example embodiments described herein.

FIG. 7c illustrates a flow diagram of example operations 760 occurring in a UE as the UE selects a DR(s) using a polynomial function. Operations 760 may be indicative of operations occurring in a UE, such as such as UE 114 and UE 120, as the UE selects a DR(s) using a polynomial function.

Operations 760 may begin with the UE selecting a subframe index that is a function of a DC index x (block 765). As an example, the UE may select a polynomial function f( ) that provides a sequence of subframe indices. For a given DC index x, f(x) provides a subframe index. In general, any polynomial function may be selected as f( ). As an illustrative example, $f(x)=mod(p(x+nc)^2+nr, N)$, where p is a polynomial index that can be randomly selected by each user, nc and nr are shift variables that may be again randomly selected taking values up to N, and mod( ) is a modulo function. It is noted that f(x) provides a subframe index i for DC index x. It may be shown that if N is chosen to be a prime number, the example polynomial function f(x) can ensure at most 4 discovery collisions in N cycles between two different sequences of subframe indices characterized by different sets of (p, nc, and nr). The use of the example polynomial function f(x) may provide about $N^3$ different sequences of subframe indices, which may be useful when the number of DRs is smaller than the number of UEs. The UE may select a DR index that is a function of a DC index x (block 767). As an example, the UE may select the same DR index for all DCs. As another example, the UE may select a polynomial function to provide a sequence of DR indices. As another example, the UE may select the same polynomial function f(x) to provide a sequence of DR indices. As another example, the UE may select a different polynomial function f2(x) to provide a sequence of DR indices.

Figure 8:
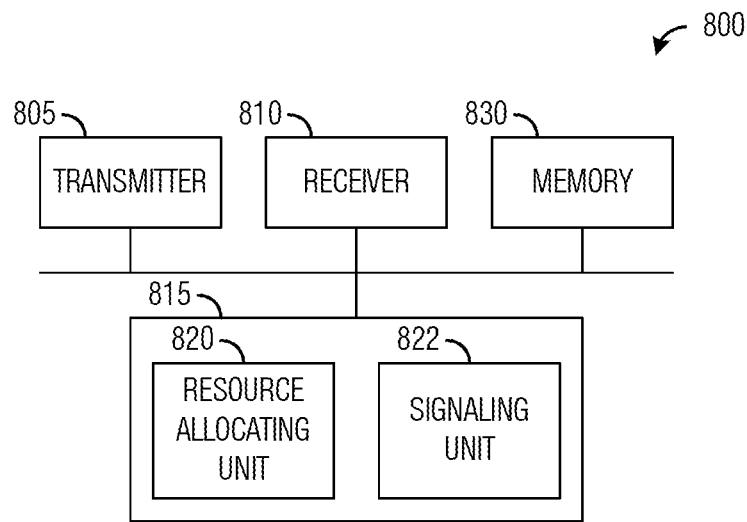
FIG. 8 illustrates a first example communications device according to example embodiments described herein.

FIG. 8 illustrates a first example communications device 800. Communications device 800 may be an implementation of a communications controller, such as an eNB, a base station, a NodeB, a controller, and the like. Communications device 800 may be used to implement various ones of the embodiments discussed herein. As shown in FIG. 8, a transmitter 805 is configured to transmit allocation information regarding DCs, and the like. Communications device 800 also includes a receiver 810 that is configured to receive frames, and the like.

A resource allocating unit 820 is configured to allocate communications system resources for a DC. A signaling unit 822 is configured to generate allocation information regarding a DC. Signaling unit 822 is configured to generate a message, such as a SIB, a higher layer message, and the like, to transmit the allocation information. A memory 830 is configured to store communications system resource allocations, allocation information, and the like.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while resource allocating unit 820 and signaling unit 822 may be software modules executing in a microprocessor (such as processor 815) or a custom circuit or a custom compiled logic array of a field programmable logic array. Resource allocating unit 820 and signaling unit 822 may be modules stored in memory 830.

Figure 9:
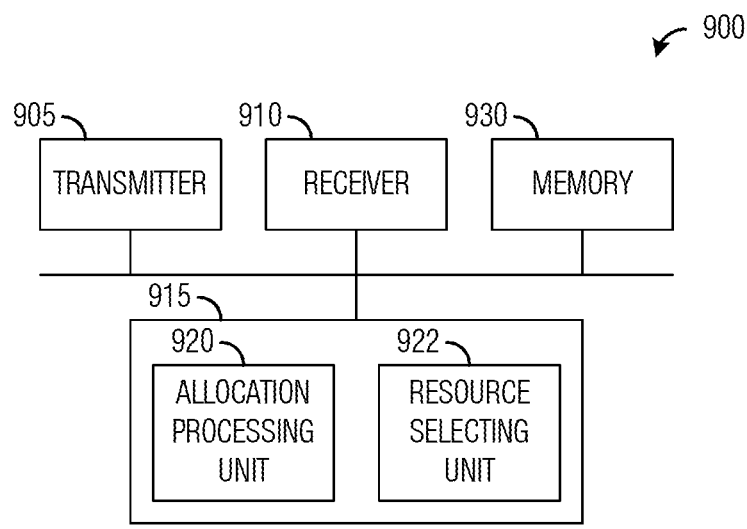
FIG. 9 illustrates a second example communications device according to example embodiments described herein.

FIG. 9 illustrates a second example communications device 900. Communications device 900 may be an implementation of a D2D device, such as a UE, a mobile, a mobile station, a user, a subscriber, a terminal, a station, and the like. Communications device 900 may be used to implement various ones of the embodiments discussed herein. As shown in FIG. 9, a transmitter 905 is configured to transmit frames, discovery signals, and the like. Communications device 900 also includes a receiver 910 that is configured to receive frames, resource allocation information, and the like.

An allocation processing unit 920 is configured to process resource allocation information to determine communications system resources allocated for a DC. A resource selecting unit 922 is configured to select a DR in the DC to transmit a discovery signal. Resource selecting unit 922 is configured to select a DC in a random manner, a pseudo-random manner, using a deterministic function, and the like.

A memory 930 is configured to store communications system resource allocations, resource allocation information, selected DRs, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while allocation processing unit 922 and resource selecting unit 924 may be software modules executing in a microprocessor (such as processor 915) or a custom circuit or a custom compiled logic array of a field programmable logic array. Allocation processing unit 922 and resource selecting unit 924 may be modules stored in memory 930.

Although the present disclosure and its advantages have been described in detail, it should be understood that various changes, substitutions and alterations can be made herein without departing from the spirit and scope of the disclosure as defined by the appended claims.

What is claimed is:

1. A method for performing device-to-device (D2D) discovery in a communications system, the method comprising:
   determining, by a device-to-device (D2D) device, resource allocation information for a discovery cycle including discovery resources allocated for transmission of discovery signals by D2D devices, wherein the determining the resource allocation information includes receiving, by the D2D device from an evolved NodeB (eNB), a value indicating the number of subframes in the discovery cycle;
   generating, by the D2D device, a hopping sequence, indexed by a discovery cycle index, using a degree two polynomial function with one of random coefficients and pseudo-random coefficients;
   selecting, by the D2D device, a first discovery resource of the discovery cycle utilizing the hopping sequence, in accordance with the resource allocation information; and
   transmitting, by the D2D device, a discovery signal in the selected first discovery resource.

2. The method of claim 1, wherein the selected first discovery resource comprises multiple physical resource block (PRB) pairs.

3. The method of claim 2, wherein the selected first discovery resource comprises at least one subframe.

4. The method of claim 1, wherein the D2D device transmits the discovery signal once per discovery cycle.

5. The method of claim 4, further comprising:
   selecting a second discovery resource of the discovery cycle in accordance with the resource allocation information; and
   transmitting the discovery signal in the selected second discovery resource.

6. The method of claim 1, wherein selecting the first discovery resource comprises randomly selecting the first discovery resource from the discovery resources allocated for transmission of discovery signals by D2D devices.

7. The method of claim 1, wherein selecting the first discovery resource comprises applying a selecting function to a parameter associated with the D2D device to determine the first discovery resource.

8. The method of claim 7, wherein the parameter comprises an identifier associated with the D2D device.

9. The method of claim 7, wherein the selecting function comprises a deterministic function.

10. The method of claim 1, where a subframe index is expressible as $$f(x)=\mod(p(x+nc)^2+nr, N),$$

where p is a polynomial index that can be selected by each D2D device, nc and nr are shift variables that may be selected and may take values up to N, and mod( ) is a modulo function.

11. The method of claim 1, wherein determining the resource allocation information comprises:
   receiving a higher layer message from the eNB including the resource allocation information.

12. The method of claim 11, wherein the resource allocation information is received from the eNB in a system information block.

13. The method of claim 1, wherein determining the resource allocation information comprises:
   retrieving pre-configured resource allocation information.

14. A method for operating an evolved NodeB (eNB), the method comprising:
   allocating, by the eNB, communications system resources for a discovery cycle, wherein the communications system resources are used in transmission of discovery signals by device-to-device (D2D) devices by generating a hopping sequence, indexed by a discovery cycle index, using a degree two polynomial function with one of random coefficients and pseudo-random coefficients, and selecting a first discovery resource of the discovery cycle utilizing the hopping sequence, in accordance with the allocated communications system resources; and
   transmitting, by the eNB, information about the allocated communications system resources including a value indicating the number of subframes in the discovery cycle.

15. The method of claim 14, wherein the information about the allocated communications system resources is transmitted in a higher layer message.

16. The method of claim 15, wherein the higher layer message comprises a system information block including the information.

17. The method of claim 14, wherein the value is N subframes, with each subframe comprising M discovery resources, where N and M are integer values, and wherein the information further comprises the M integer value.

18. A device-to-device (D2D) device comprising:
   a receiver configured to receive from an evolved nodeB (eNB) a value indicating a number of subframes in a discovery cycle;
   a processor operatively coupled to the receiver, the processor configured to:
      determine resource allocation information for the discovery cycle including discovery resources allocated for transmission of discovery signals by D2D devices and including the value indicating the number of subframes in the discovery cycle,
      generate a hopping sequence, indexed by a discovery cycle index, using a degree two polynomial function with one of random coefficients and pseudo-random coefficients, and
      select a first discovery resource of the discovery cycle utilizing the hopping sequence, in accordance with the resource allocation information; and a transmitter operatively coupled to the processor, the transmitter configured to transmit a discovery signal in the selected first discovery resource.

19. The D2D device of claim 18, wherein the processor is configured to select a second discovery resource in accordance with the resource allocation information, and wherein the transmitter is configured to transmit the discovery signal in the selected second discovery resource.

20. The D2D device of claim 18, wherein the processor is configured to randomly select the first discovery resource from the discovery resources allocated for transmission of discovery signals by D2D devices.

21. The D2D device of claim 18, wherein the processor is configured to apply a selecting function to a parameter associated with the D2D device to determine the first discovery resource.

22. The D2D device of claim 18, wherein the receiver is configured to receive a higher layer message including the resource allocation information.

23. The D2D device of claim 22, wherein the resource allocation information is received by the receiver from the eNB in a system information block.

* * * * *